April 9, 1963 D. S. CLEVELAND 3,084,560
GYRO INTEGRATOR WITH PRECESSION RATE OUTPUT SIGNAL
Filed Aug. 3, 1961 2 Sheets-Sheet 1
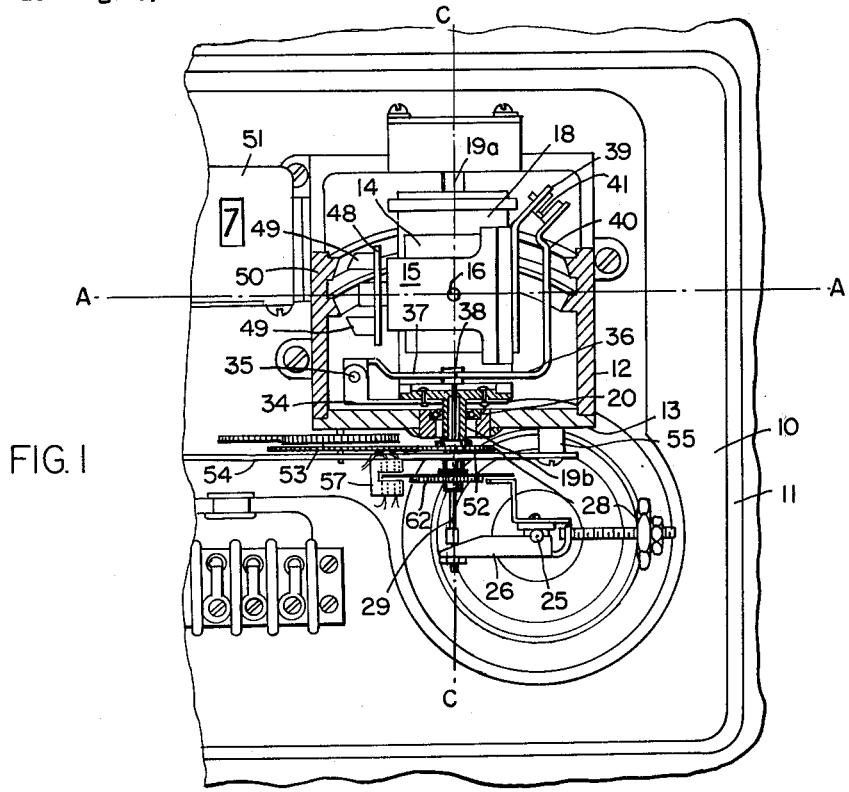
FIG. 1
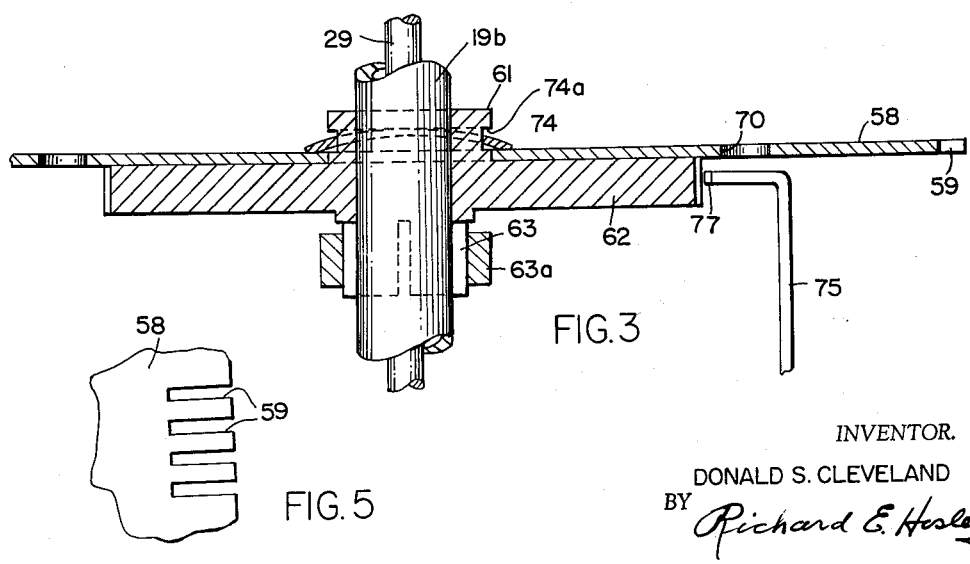
FIG. 3
FIG. 5
INVENTOR.
DONALD S. CLEVELAND
BY Richard E. Hosley
HIS ATTORNEY

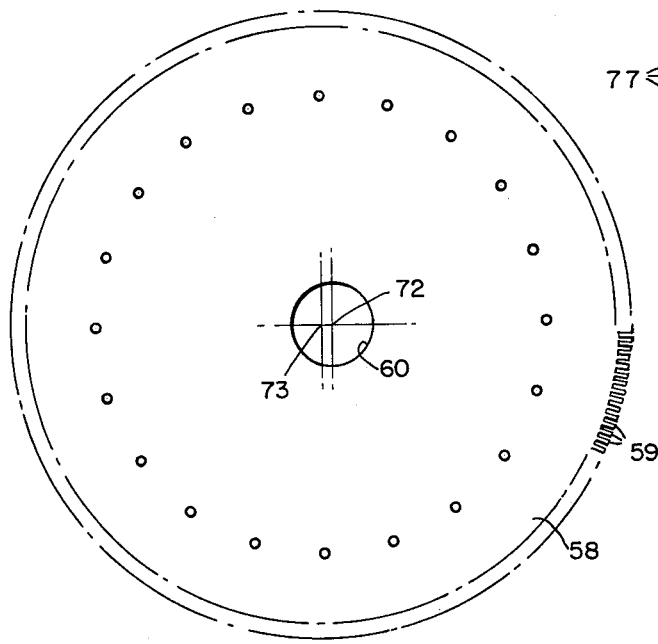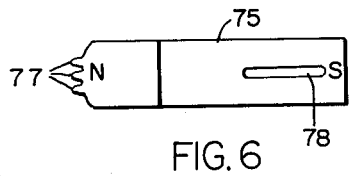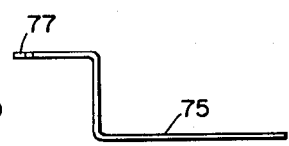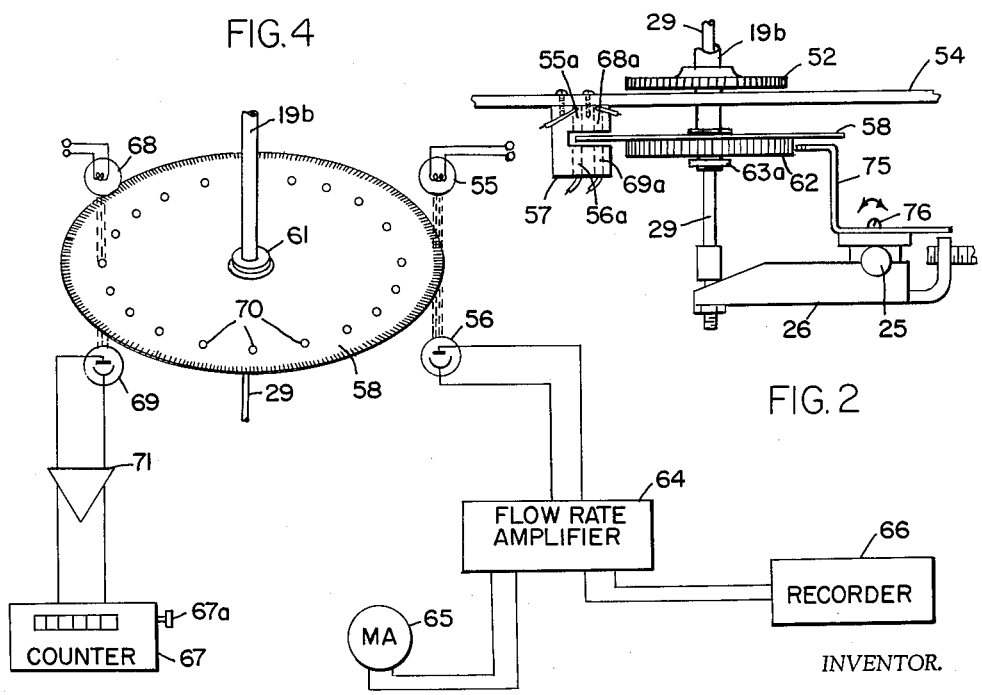

3,084,560
GYRO INTEGRATOR WITH PRECESSION
RATE OUTPUT SIGNAL
Donald S. Cleveland, Beverly, Mass., assignor to General
Electric Company, a corporation of New York
Filed Aug. 3, 1961, Ser. No. 128,990
9 Claims. (Cl. 74—5.6)

The present invention relates to gyroscopic devices and more particularly to a gyroscopic device of the type wherein a torque proportional to a quantity being measured is applied to a universally mounted gyroscope causing precession of the gyroscope at a rate proportional to the quantity. A device of this general type is shown in prior Patent 2,964,954, Cleveland, issued December 20, 1960, which is assigned to the same assignee as the present invention. To obtain an integrated output, the gyro is connected to drive a register mechanism of the cyclometer or other suitable type. While these gyroscopic devices may be used to measure and integrate the output of any sensing device having a torque output, they are especially useful in obtaining an integrated output of mass rate flowmeters of the type disclosed and claimed in Jennings Patent 2,714,310 issued August 2, 1955, which is also assigned to the same assignee as the present invention.

For some applications one or more flowmeters with gyro integrators may be used to control batch blending operations in which two or more fluids are admitted to a mixing container in predetermined quantities. For such application it is useful to the operator to be able to determine at a glance the rate of fluid flow as well as the total quantity. Also for such operations it is helpful to have a high resolution counter that may be easily zeroed prior to each mixing operation as distinguished from an integrating register mechanism measuring total mass flow of fluid through the particular meter involved.

Accordingly, it is an object of my invention to provide a gyro integrator for use with mass flowmeters as well as other measuring devices which permits a determination, with high resolution and without computation, of the instantaneous rate of precession of the integrating gyro and the corresponding instantaneous rate of the quantity being integrated by the gyro. In flowmeter applications this would be the instantaneous mass rate of flow of the fluid the flow of which is being measured.

A further object of my invention is to provide a gyro integrator with a pickoff attachment for obtaining a gyro precession rate output signal without impairing the accuracy of the gyro because of friction load torques.

Another object of my invention is to provide an improved gyro integrator with a precession rate pickoff that is insensitive to periodic variations in the precession rate caused by action of the gyro leveling system whereby accurate instantaneous rate signals are given at all times.

A still further object of the invention is to provide a gyro integrator with rate pickoff which gives high resolution rate signals without spurious signals under zero or low input torque conditions arising from externally induced vibrations of the integrating equipment.

A still further object is to provide a gyro integrator which indicates total value of the quantity integrated and also total quantity for a particular operation as well as instantaneous rate of the quantity being integrated.

Other objects and advantages of my invention will become apparent as the following description proceeds.

Briefly, in accordance with my invention, I provide a gyro integrator with a photoelectric type of rate pickoff to obtain high resolution and high accuracy signals proportional to gyro precession rate which corresponds to the rate of the quantity being integrated. In general, a high accuracy rate signal is obtained by an arrangement which eliminates various sources of error which have heretofore been found to be troublesome. One source of error arises from application of torques to the integrating gyro resulting from friction in the pickoff coupling to the gyro. According to one aspect of this invention, this error is eliminated by use of a frictionless, photoelectric type of pickoff comprising a light source, a photocell exposed to light from said source, and a perforate light chopper disk coupled to rotate with the gyro about its major axis of precession.

Another source of error arises from creep of the gyro under zero or low input torque conditions. According to another aspect of this invention, this error is prevented by use of a positive lock anti-creep device which acts to lock the gyro in any position about its major axis when the input torque drops below a predetermined threshold value. Because its action is positive and because it operates in any position of the gyro about its precession axis, the positive lock anti-creep arrangement for high resolution applications is an improvement over the magnetic detent disclosed and claimed in my above-mentioned Patent 2,964,954.

Another source of error arises from periodic modulation of the gyro precession speed resulting from application to the gyro of dithering torques to reduce or eliminate the effects of friction in the input linkage. Such an arrangement, for example, is disclosed and claimed in a copending application of Harold E. Trekell, Serial No. 44,130 filed July 20, 1960, now Patent No. 3,000,223, issued September 19, 1961 and assigned to the same assignee as the present invention. The effect of the precession speed modulation is, in accordance with another aspect of my invention, effectively eliminated by an adjustable eccentric mounting of the light chopper disk forming a part of the photoelectric pickoff as will be more readily apparent from the following detailed description.

For a more detailed description of the present invention, reference should now be made to the following description taken in connection with the accompanying drawings in which:

FIG. 1 is a fragmentary front elevation view, partly in section, of a gyro integrating mass flowmeter provided with a gyro integrator having a photoelectric rate pickoff constructed in accordance with the present invention;

FIG. 2 is an enlarged view of part of the apparatus shown in FIG. 1 showing the arrangement of the light chopper disk and the positive lock anti-creep mechanism;

FIG. 3 is a fragmentary side elevation view showing certain constructional details of the light chopper disk;

FIG. 4 is a plan view of the light chopper disk showing the arrangement of the circular and slotted perforations and the eccentricity of the central mounting hole;

FIG. 5 is a fragmentary detailed view showing the arrangement of the peripheral slots in the light chopper disk;

FIG. 6 is a plan view of the pawl forming a part of the positive lock anti-creep mechanism;

FIG. 7 is a side view of the pawl of FIG. 6; and

FIG. 8 is a schematic representation of the photoelectric rate pickoff system showing the interconnection of the various parts of the system.

Referring now to the drawings, and particularly to FIG. 1, there is disclosed a gyro integrator which, in the illustrated embodiment, is shown as being supported on and actuated by a mass flowmeter. The integrator is supported on a base member 10 carrying a flange 11 supporting a casing (not shown) which encloses the gyroscope mechanism. The integrator comprises a universally supported gyroscope mounted on a support 12 carrying a base plate 13. The gyroscope comprises a rotor 14 having a normally horizontal spin axis extending in the direction of axis A—A. The rotor is supported by bearings in a frame 15 having trunnions 16 supported by bearings which permit rotation of the rotor frame about the minor axis of the gyroscope which, in the position shown in FIG. 1, extends in a direction perpendicular to the plane of the drawing. These bearings are carried by a gyro gimbal 18 having vertically disposed upper and lower trunnions 19a and 19b supported by bearings 20 permitting the gimbal to rotate about the vertical major axis C—C of the gyroscope. As is customary with universally mounted gyroscopes, the gyro spin axis A—A, the minor axis, and the major axis C—C all intersect at a common point at the center of the gyroscope known as the center of suspension.

The gyro rotor is preferably constructed of a heavy material such as tungsten so as to have high inertia, and the rotor is driven at high speed by suitable driving means, usually an electric motor. The details of the motor are omitted for clarity since the construction thus far described is conventional and well known.

The gyro integrator operates on the principle that a torque applied about the minor axis of the gyroscope causes the gyroscope to precess about the major axis in accordance with the well-known law of gyroscopic precession. The integrator makes use of the fact that the rate of gyro precession is proportional to the precessing torque applied to the gyro. A signal torque variable in accordance with the quantity to be integrated is applied about the minor axis of the gyroscope which causes the precessional rotation about the major axis at a rate variable with the input signal torque. In order to obtain an integrated output, the precessional rotation of the gyroscope drives a suitable register mechanism which can be calibrated to read output of the quantity being measured.

While the gyro integrator forming the present invention may be used with any sensing device, there is shown for the purpose of illustration, an arrangement in which the input signal torque is taken from the output of a mass flowmeter of the type disclosed in the above-mentioned patent application of H. E. Trekell. The complete mass flowmeter is not shown since it forms no part of the present invention. However, it will be understood that the mass flowmeter may consist of two cylindrical elements, an impeller and a turbine, coaxially arranged in the stream of a fluid, the mass of which is to be measured. Both elements contain channels through which the fluid flows. The impeller is driven at a constant speed by a synchronous motor and imparts angular velocity of the fluid as it flows through the impeller. The value of this angular momentum added to the fluid is proportional to the mass rate of flow. The turbine, which is located downstream from the impeller, removes the angular momentum from the fluid and, in so doing, receives a torque proportional to the angular momentum and to the mass rate of the flow. It is this torque that is used as the input torque to the gyro integrator in the illustrated embodiment of the invention.

The turbine of the flowmeter which experiences the input torque proportional to the quantity (mass flow rate) being measured is connected to rotate a shaft 25 extending in the direction of its axis perpendicular to the plane of the drawing of FIG. 1. This shaft 25 carries a crank arm 26 supporting on one end an adjustable counterbalance weight 28. Torque is transmitted from the other end of crank arm 26 to the gyro integrator through an upwardly extending force rod 29.

The upper end of the force rod 29 extends through the lower trunnion 19b of the gyro, which is hollow, and is supported in suitable bearings so as to permit axial movement of the rod. It will be understood that, as the shaft 25 rotates clockwise slightly in response to an increase in the flow rate is indicated by a deflection of the flowmeter turbine, it causes the force rod 29 to move upwardly.

The torque developed by the flowmeter turbine and transmitted through the force rod 29 is applied to the gyroscope as an input torque by an adjustable mechanism which will now be described. As best seen in FIG. 1, there is attached to the lower end of the gimbal 18, and rotatable therewith, a supporting arm 34 on which is mounted for rotation about a pivot 35 an L-shaped lever 36. The lever 36 has a horizontal arm 37 the outer end of which is connected to the support 34 through the pivot 35. The central part of the arm 37 carries a bearing member 38 against which the upper end of the force rod 29 abuts so that the vertical movement of the force rod causes a counterclockwise rotation of the lever. Extending from the rotor frame 15 is an arm 39 which is engaged by an upstanding arm 40 forming a part of the L-shaped lever 36 through a low-friction, adjustable pivot 41.

In order to maintain the desired relationship between the input torque applied to the gyroscope and the resulting precessional rotation, it is important that the spin axis A—A of the gyro be maintained continuously in a position in which it is approximately normal to the major axis C—C. To accomplish this, there is provided an eddy current leveling system of the same general type as that disclosed and claimed in Patent 2,585,693, Sinks et al., which is assigned to the same assignee as the present invention. This leveling system comprises basically a magnet arrangement carried by the gyroscope to produce a rotating magnetic field and a relatively fixed conductor member disposed in inductive relation to the rotating magnetic field so as to impose eddy current drag torques on the gyro to maintain it in a level position. In the illustrated arrangement, the means for producing the rotating magnetic field comprises a circular disk 48, preferably formed of magnetic material carried on the end of a shaft extension of the gyro rotor. Affixed to and projecting outwardly from the disk 48 are a series of cylindrical permanent magnets 49 which produce a magnetic field projecting outwardly from the gyro rotor. Since the disk 48 rotates with the rotor, the magnets produce a rotating magnetic field, the axis of which is coincident with the spin axis of the gyro. The magnets are preferably magnetized so that the outer ends of adjacent magnets have opposite polarity to create a symmetrical, high-intensity magnetic field.

Disposed in inductive relation to the magnetic field produced by the magnets is a relatively fixed, cylindrical grooved leveling ring 50 formed of a suitable electrical conducting material, such as aluminum, which, in the illustrated arrangement, is formed integrally with the suport member 12, the arrangement being such that the axis of the ring is inclined slightly to the major axis C—C of the gyro. Preferably, the surface of the leveling ring adjacent the rotating magnets is ground with a spherical surface which matches a complementary spherical surface ground on the end of the magnets so as to maintain close clearance and a resulting high flux density for various positions of the gyro rotor relative to the conductor. In will be understood that, as the magnets 49 rotate, the magnetic flux therefrom sweeps the conductor member so as to cause generation of the eddy currents in the conductor member. The rotating magnets and the coacting conductor member form an eddy current leveling system, the function of which is to maintain the spin axis A—A of the gyroscope in the position in which it is parallel to the plane of the leveling ring 50. Because the axis of the leveling ring 50 is inclined slightly to the major axis of the gyro, the gyro experiences periodic reversing torques about the minor axis as it precesses around the major axis. This causes an oscillation or dithering of the connected input torque linkage including the force rod 29, and this action reduces or eliminates the effect of friction in the input linkage as disclosed and claimed in the above-mentioned Trekell application.

To totalize the precessional rotation of the gyro about its major axis, there is provided a register mechanism of the cyclometer type indicated generally at 51. This register mechanism is driven by means of a trunnion gear 52 attached to the lower, hollow trunnion 19b which drives the register through a series of spur gears forming a reduction gear train 53. The gearing and a bearing for the trunnion gear are supported by a plate 54 carried by posts 55 depending from the base plate 13.

The construction of the gyro integrator as thus far described for necessary background information is known. For applications of gyro integrators such as, for example, those used in gyro integrating mass flowmeters for controlling batch blending operations, there is a need for indicating the instantaneous rate of mass flow of fluid as well as the total flow indicated by register mechanism 51. In accordance with the present invention, an arrangement is provided for obtaining instantaneous rate information in the form of an attachment to the gyro integrator which will now be described.

In order to obtain an indication of the rate of precession of the gyro corresponding to the instantaneous rate of the quantity being integrated, there is provided a photoelectric type of pickoff comprising a light source 55 (FIG. 8) and a photocell 56, both mounted in oppositely disposed holes 55a and 56a in a stationary C-shaped support 57 depending from the base plate 54, the mounting arrangement being such that the photocell is exposed to a light beam emanating from the light source 55. Mounted on an extension of the hollow trunnion 19b for rotation with the trunnion about the major axis C—C of the gyro is a light chopper disk 58. As best shown in FIGS. 3, 4, and 5 of the drawing, the light chopper disk is circular and comprises a set of peripherally disposed perforations in the form of slots 59 extending completely around the disk. These are shown in detail in FIG. 5. The disk 58 has a central mounting hole 60 dimensioned to receive a collar 61 projecting upwardly from a gear 62 which is also carried on the hollow trunnion 19b for rotation therewith. The gear 62 has a slotted depending hub portion 63 which holds the gear 62 to the trunnion 19b with the aid of a friction clamp 63a. The light source 55 and the photocell 56 are positioned relative to the light chopper gear 58 so that light from the source passing through the disk slots 59 is periodically interrupted as the disk rotates. Rotation of the disk, therefore, causes a periodic modulation in the output of photocell 56 at a frequency which is proportional to the speed of rotation of the disk. The photocell 56 may, for example, be of a photoconductive type formed of cadmium selenide characterized by the fact that its resistance is a function of incident light impinging thereon. The output circuit of the photocell, which includes a source of voltage not shown, is fed to a suitable amplifier 64 of known construction having an output which may be in the form of a milliampere signal the magnitude of which varies in proportion to the frequency of the photocell output. This signal may, for example, be read by an appropriate instrument such as a milliammeter 65. The frequency of the output of the photocell 56 and hence the indication of the milliammeter 65 are proportional to the rotational speed of disk 58, and this in turn corresponds to the precession speed of the gyro and the instantaneous rate of the quantity being integrated by the gyro integrator, so there is provided an instantaneous rate indicator which may be calibrated in terms of the quantity being indicated. Since the light chopper disk 58 develops the rate signal by interruption of the light beam passing from the source 55 to the photocell 56, there is no friction applied to the integrating gyroscope caused by its operation and hence no error caused by use of the rate pickoff. The amplifier 64 may be provided in a known manner with other outputs for indication and control purposes. Thus, for example, an additional amplifier output may be used to actuate a recorder indicated schematically by numeral 66.

In one embodiment of the invention, which has been built and tested, the light chopper disk having an outer diameter of 2.4 inches was provided with 300 peripheral slots. These radially extending slots were cut to a depth of .050 inch with a milling cutter. The integrating gyro had an operating range of precession speed of 0 to 10 R.P.M. giving an operating range of the photocell 56 from 0 to 50 cycles per second. The light source used was a filament type of lamp provided with an integral lens thus requiring no special lens system. If 60 cycle A.C. power is used to energize the light source, the 120 cycle "ripple" noise may be removed by suitable filtering.

In order to provide an easily reset totalizing counter having a higher resolution than the register 51, there is shown a counter 67 of the electronic impulse type having a reset control 67a of known construction. This counter is actuated by a second photoelectric pickoff system comprising a light source 68 and a photocell 69 which are conveniently mounted in a second set of oppositely located holes 68a and 69a located in the C-shaped support 57. The light chopper disk 58 is provided with a series of circularly arranged perforations or holes 70 arranged to permit periodic passage of light from source 68 to photocell 69 as the disk rotates. A suitable amplifier and power supply 71 amplifies the pulses which are used to actuate the counter 67. The light source 68 and photocell 69 may conveniently be the same size and type as the light source 55 and photocell 56 used to provide the rate indication. If, for example, the gyro integrator of the present invention is used with a mass rate flowmeter having a capacity of 120,000 pounds per hour, the light chopper disk may be provided with 20 holes, as shown, to provide a pulse and indication of the counter 67 for each 10 pounds measured.

In use a photoelectric pickoff in a gyro integrator of the type described to obtain a rate signal proportional to the speed of gyro precession and the rate of the quantity being measured, difficulty has been experienced with a spurious output signal of the rate indicator 65 in the form of a modulation having a frequency related to the precession speed of the gyro. This is caused by the tilt of the leveling ring 50 used to apply an oscillating or dithering torque to the gyro to reduce or eliminate the effect of friction in the torque input linkage as explained above. This oscillating gyro torque causes a corresponding oscillation in the precession speed of the gyro and this is reflected in a corresponding oscillation in the output of the rate indicator 65. This tends to impair the accuracy of the instrument especially for operations where the gyro integrating mass flowmeter is used for precise batch measurement and control in chemical processing plants. In accordance with another aspect of my invention, this cyclic error is effectively eliminated in a simple but effective way which will now be explained.

Referring to FIG. 4, it will be noted that the center 72 of the mounting hole 60 of disk 58 is displaced from the center 73 of the peripheral slots 59. Because of this eccentric mounting arrangement of the disk, the radius and hence the linear speed of the slots 59 adjacent the light source 55 and photocell 56 vary cyclically as the disk rotates. By proper selection of the phase angle and magnitude, this frequency modulation effect may be made approximately equal and opposite to the frequency modulation effect caused by periodic variation of the gyro precession speed so that the net effect in the rate output signal is substantially zero. In order to provide means for adjusting the phase angle and magnitude of this compensating signal, it will be noted that the hub 61 which projects through disk hole 60 to position the disk 58 on gear 62 is also made eccentric by the same amount as the eccentricity of slot center 73 relative to hole center 72. The disk 58 is frictionally retained in position relative to the hub 61 by means of a C-shaped dished washer 74 retained in a groove 74a in hub 61 which permits the disk 58 to be rotated by force relative to gear 62 to provide an initial adjustment of the eccentricity of the disk relative to trunnion 19 and hence the amplitude of the frequency compensating signal. To provide an adjustment of the phase angle of the frequency compensating signal, it is only necessary to loosen clamp 63a and rotate the gear 62 and disk 58 assembly on trunnion 19b.

To prevent drift or creep of the gyro due to application of spurious signal torques through torque input shaft 25, there is provided an anti-creep device which acts positively to lock the gyro so as to prevent precession whenever the input signal torque drops below a predetermined threshold value. For this purpose, a Z-shaped pawl 75 is mounted on an extension of crank arm 26 by a mounting screw 76 so as to rotate with shaft 25 and arm 26. One end of pawl 75 is provided with gear teeth 77 arranged to engage and mesh with the teeth of gear 62 and thus positively lock the gear and gyro trunnion 19 whenever shaft 25 rotates counterclockwise (as viewed in FIG. 2) to a predetermined zero or low input torque position. The other end of pawl 75 has an elongated slit 78 receiving screw 76 so as to permit adjustment of the locking position of the pawl. It will be understood that by selecting the number of teeth on gear 62 and pawl 75 relative to the number of slots 59 in disk 58, the number of locking positions may be made adequate for the degree of accuracy required. Satisfactory operation has been obtained with a ratio of slots to gear teeth of 3 to 1. Because of the firm locking action, spurious signals caused by vibration of the disk slots 59 in the path of the light falling on photocell 56 in the locked position is prevented. Another important advantage of this anti-creep arrangement is that the gyro is locked in any position as soon as the input torque applied to shaft 25 falls below a predetermined value, it being unnecessary for the gyro to continue precession until it reaches some predetermined locking position as in the case of the magnetic detent disclosed and claimed in my prior Patent 2,964,954.

To assist in holding the pawl in engagement with gear 62 for input torque values near the operating threshold value of disengagement torque, the pawl may be formed of permanent magnet material and the end magnetized as indicated by the polarity mark N shown in FIG. 6. The magnetized end of the pawl is then attached to and held in engagement with the teeth of gear 62 which are formed of magnetic material until the input torque is sufficient to overcome the biasing force of the magnetized pawl.

It will be understood that the gravitational balance of the lever system transmitting the input torque to the gyro may be adjusted by means of the adjustable counterbalance weight 28. For accurate integration, the gyro precession speed-input torque relationship, as indicated, for example, by a torque input versus gyro precessional speed curve, should pass through zero and this relationship is obtained in the following manner. First, the gyro is unbalanced about its minor axis as, for example, drilling small holes in the frame 15 to cause precession at a forward direction at a rate corresponding say to 3 percent of normal maximum speed without application of any torque through the input linkage including the force rod 29. The counterweight 28 is then adjusted to the threshold point of engagement of the pawl 75 with gear 62 when the input torque applied to shaft 25 is 3 percent of the normal maximum value. Then at lower input torque values the gyro will be locked and the indicated rate output will be zero. At higher input torque values the gyro precession speed and indicated rate output will correspond to the input torque. When the pawl 75 is magnetized, as shown, there will be a small differential between the input torque causing engagement and that causing disengagement of the pawl. This effect is, however, negligible and does not seriously affect the accuracy of the instrument.

From the foregoing description it is believed that the operation of my improved gyro integrator with rate signal output will now be clear. A torque proportional to an input signal to be integrated is applied to shaft 25 to cause clockwise rotation thereof as viewed in FIG. 1 and FIG. 2. This causes force rod 29 and arm 36 to lift applying a corresponding counterclockwise torque to the gyro frame 15 about the minor axis of the gyro. As a result of this torque application the gyro precesses about its major axis C—C at a speed proportional to the input torque signal. Total precession of the gyro is indicated by the mechanical register 51 which is driven by gear connection to the gyro trunnion 19b as in previous gyro integrators.

For producing a rate signal in accordance with the invention, precessional rotation of the gyro drives disk 58 whereby light impinging on photocell 56 from source 55 is periodically interrupted by slots 59 at a speed proportional to gyro precession speed and input signal torque. This rate output is indicated by an instrument 65 and the signal may be used to actuate other indicating or control devices such as recorder 66.

When the input signal torque drops below a predetermined value, shaft 25 rotates counterclockwise to a position where pawl 75 engages gear 62 and locks the gyro. This stops immediately the integrating and rate output functions of the gyro integrator. This locking action is augmented by the magnetic action of pawl teeth 77.

To compensate for the gyro precession speed variations caused by the tilted leveling ring 50, the light chopper disk 55 is eccentrically mounted and its degree of eccentricity is initially adjusted by rotation of the disk 58 on the gear 62. The phase angle of the compensating signal arising from the eccentric disk mount is adjusted by initially rotating the assembled disk 58 and gear 62 on trunnion shaft 19b.

The arrangement of holes 70 in disk 58 chops the light impinging on the second photocell 69 to cause pulsed operation of the batch counter 67 which may be conveniently reset after each measuring operation by actuating reset control 67a.

Because of the high resolution of the rate output signal obtained by using a relatively large number of light chopping slots 59 and because of the quick stop action of the anti-creep pawl 75, the gyro integrator is precise in its start, stop, and rate indicating action thus giving accuracy of rate and total quantity being measured, which is especially important for batch blending and control operations. Elemination of the cyclic speed error caused by friction error eliminating gyro dithering torques further increases the accuracy of the instrument.

While there are shown and described particular embodiments of the invention, it will occur to those skilled in the art that various changes and modifications may be made without departing from the invention; and it is therefore intended in the appended claims to cover all such changes and modifications as fall within the true spirit and scope of the invention.

What I claim as new and desire to secure by Letters Patent of the United States is:

1. A gyro integrator comprising a gyro rotor universally mounted on a support for movement about major and minor axes, means connected to apply an input torque to said gyro about the minor axis to cause precession thereof about the major axis, leveling means maintaining the spin axis of the gyro in a leveling plane, said plane being inclined to a plane perpendicular to said major axis to reduce friction effects of the torque input system whereby the gyro precesses at a periodically varying speed about the mapor axis, photoelectric means measuring the gyro precession rate comprising a light source, a photocell exposed to light from said source, and a light chopper disk having a plurality of circularly arranged perforations disposed between said source and photocell and coupled to rotate with said gyro about the major axis, precession rate indicating means actuated by the output of said photocell, said light chopper disk being eccentrically mounted relative to the center of said perforations to compensate for periodic variations in the gyro precession speed caused by action of the leveling means.

2. A gyro integrator as set forth in claim 1 wherein the light chopper member is provided with adjusting means for adjusting the phase relationship and amplitude of oscillation of the light chopper disk caused by its eccentric coupling to said gyro.

3. A gyro integrator comprising a gyro rotor universally mounted on a support for movement about major and minor axes, means comprising a rotatable shaft connected to apply input torque to said gyro about the minor axis to cause precession thereof about the major axis, photoelectric means measuring the gyro precession rate comprising a light source, a photocell exposed to light from said source, and a perforate light chopper disk coupled to rotate with said gyro about its major axis and periodically to interrupt the light falling on said photocell from said source, precession rate indicating means actuated by the output of said photocell, and anti-creep means arranged positively to lock said gyro and disk when said input torque falls below a predetermined value.

4. A gyro integrator as set forth in claim 3 wherein the positive anti-creep means comprises a gear member mounted to rotate with said gyro about the major axis and a pawl positioned by the input shaft and arranged to engage and lock said gear and gyro when the torque input shaft reaches a predetermined position.

5. A gyro integrator as set forth in claim 3 wherein the positive anti-creep means comprises a gear member mounted to rotate with said gyro about the major axis and a pawl positioned by the torque input shaft and arranged to engage and lock said gear and gyro when the torque input shaft reaches a predetermined position, said pawl and gear members being magnetized to develop a holding torque in the locked position.

6. A gyro integrator comprising a gyro rotor universally mounted on a support for movement about major and minor axes, input linkage means connected to apply an input torque to said gyro about the minor axis to cause precession thereof about the major axis, leveling means maintaining the spin axis of the gyro in a leveling plane, said plane being inclined to a plane perpendicular to said major axis to reduce friction effects of said input linkage means whereby the gyro precesses at a periodically varying speed about the major axis, photoelectric means measuring the gyro precession rate comprising a light source, a photocell exposed to light from said source, and a light chopper disk having circular perforations disposed between said source and photocell and coupled to rotate with said gyro about the major axis, precession rate indicating means actuated by the output of said photocell, said light chopper disk being eccentrically mounted relative to the center of said perforations to compensate for periodic variations in the gyro precession speed caused by action of the leveling means, and anti-creep means arranged positively to lock said gyro and disk when said input torque falls below a predetermined value.

7. A gyro integrator as set forth in claim 6 wherein the positive anti-creep means comprises a gear member mounted to rotate with said gyro about the major axis and a pawl positioned by said input linkage means and arranged to engage and lock said gear when the input torque falls below a predetermined value.

8. A gyroscopic device comprising a gyro rotor universally mounted on a support for movement about major and minor axes, means comprising a rotatable shaft connected to apply input torque to said gyro about the minor axis to cause precession thereof about the major axis, and anti-creep means arranged positively to lock said gyro when said input torque falls below a predetermined value, said anti-creep means comprising a gear member mounted to rotate with said gyro about the major axis and a pawl positioned by the torque input shaft to engage and lock said gear and gyro when the torque input shaft reaches a predetermined position.

9. A gyroscopic device comprising a gyro rotor universally mounted on a support for movement about major and minor axes, means comprising a rotatable shaft connected to apply input torque to said gyro about the minor axis to cause precession thereof about the major axis, and anti-creep means arranged positively to lock said gyro when said input torque falls below a predetermined value, said anti-creep means comprising a gear member mounted to rotate with said gyro about the major axis and a pawl positioned by the torque input shaft to engage and lock said gear and gyro when the torque input shaft reaches a predetermined position, said pawl and gear members being magnetized to develop a holding torque in the locked position.

References Cited in the file of this patent
UNITED STATES PATENTS

| | | |
|---|---|---|
| 2,914,945 | Cleveland | Dec. 1, 1959 |
| 2,954,700 | Deschamps | Oct. 4, 1960 |
| 2,964,954 | Cleveland | Dec. 20, 1960 |
| 3,000,223 | Trekell | Sept. 19, 1961 |